May 3, 1932. J. Y. SNYDER 1,857,034
APPARATUS FOR SEPARATING LIQUIDS FROM GASES
Filed Nov. 13, 1929
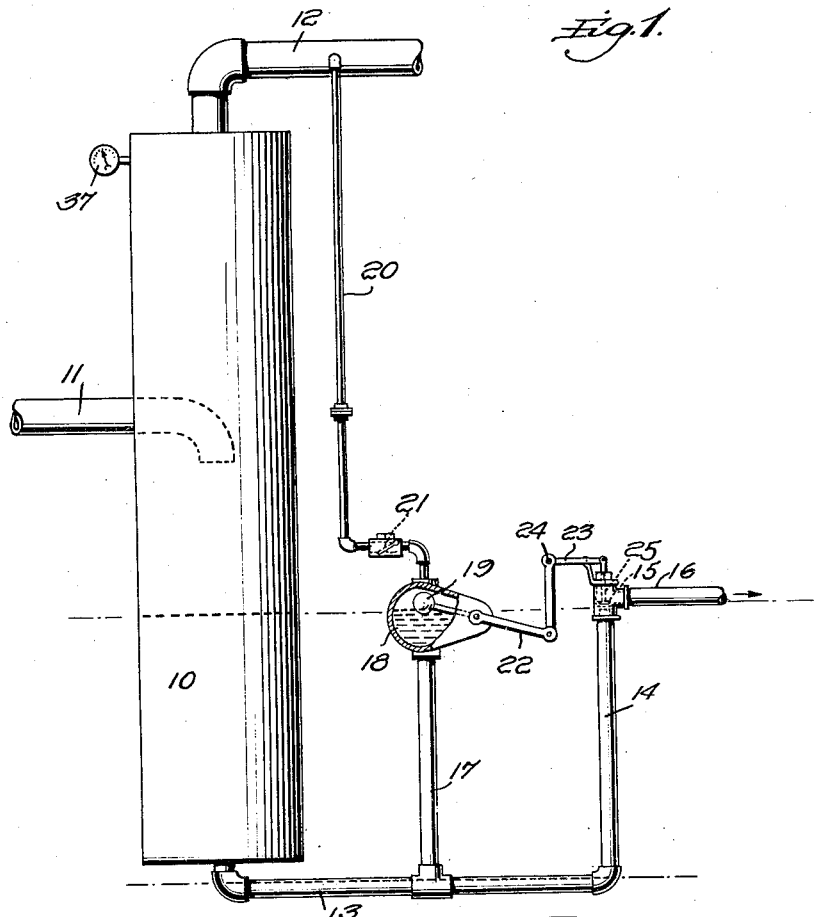
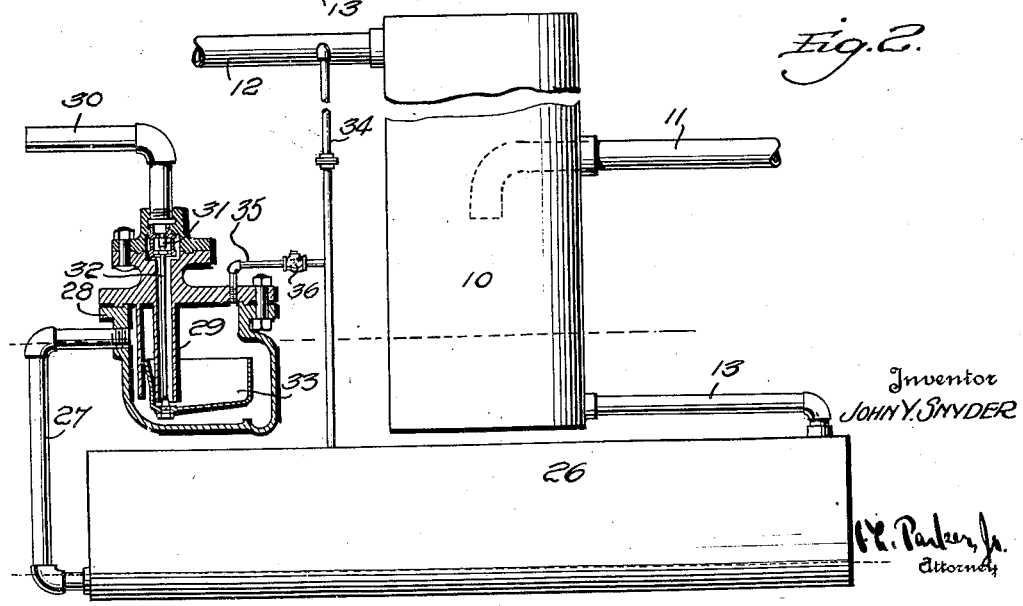
Inventor
JOHN Y. SNYDER Patented May 3, 1932

1,857,034

UNITED STATES PATENT OFFICE

JOHN YOUNG SNYDER, OF SHREVEPORT, LOUISIANA

APPARATUS FOR SEPARATING LIQUIDS FROM GASES

Application filed November 13, 1929. Serial No. 406,891.

This invention relates to improvements in apparatus for separating liquids from gases.

It has always been desirable to separate the liquid and gas which flow together from gas wells, or oil wells and the like, and it has been customary to permit the liquid and gas to discharge into a separating tank wherein means are provided for carrying off the gas in one line and the liquid in a separate line. Many types of separators have been designed to insure the separation of the liquid from the gas, but in all of these types the liquid is either discharged continuously or in relatively small unit volumes at frequent intervals.

Various means have been utilized to discharge the liquid from the separating tank either continuously or in relatively small unit volumes. Most of the apparatus referred to operate to discharge the liquid when the latter has reached a certain height in the separating tank and the discharging means function only when the liquid is maintained at the given height, thus providing for the discharge continuously of an amount of liquid equal only to the amount of liquid entering the tank after the liquid has reached the given height.

However, there are some types of apparatus having bucket traps and the like associated therewith which operate to discharge at frequent intervals an amount of liquid equal to the capacity of the bucket. This type also operates when the liquid reaches a given height to discharge the contents of the bucket, which discharge naturally lowers the height of the liquid in the tank and prevents further discharge until the given height is again reached by the liquid in the tank. In this type of apparatus it will be obvious that the amount of liquid discharged at each operation is negligible compared to the amount of liquid remaining in the tank.

The continuous and constant movement of parts in the types of apparatus referred to results in excessive wear, expense and attention, and in the oil and gas fields where it is desirable that the apparatus should operate automatically without attention, over long periods of time, the demand for constant attention and replacement of parts seriously limits the area which can be covered by one workman.

I have discovered that the life of the separating apparatus can be materially increased, expense minimized and the need for constant attention by workmen obviated, if the apparatus is designed to discharge substantially the entire liquid contents of the tank at one operation, thereby placing the operating parts of the apparatus in operation only at infrequent intervals. I have also discovered that it is possible to utilize the pressure of the gas in the separating tank to insure the discharge of the liquid without permitting the escape of the gas with the discharging liquid.

Accordingly, it is an object of this invention to provide an apparatus of the character described wherein substantially the entire liquid contents of the separating tank is discharged therefrom in one operation.

Another object is to provide means whereby the discharge of the liquid contents of the tank is effected by utilizing the pressure of the gas which accompanies the liquid into the separating tank.

A further object is to provide an apparatus of the character referred to wherein the liquid discharge means is operable when the liquid reaches a predetermined high level in the separating tank and remains in operation until substantially all the liquid has been discharged from the tank, or until the liquid reaches a predetermined low level, when the discharge automatically ceases, and automatically begins when the liquid again reaches its predetermined high level.

Other objects and advantages of the invention will become apparent during the course of the following description.

In the drawings I have shown preferred embodiments of the apparatus. In this showing, Figure 1 is a side elevation of one type of apparatus, and, Figure 2 is a side elevation of a modified form of apparatus.

Referring to the drawings, the numeral 10 indicates a separating tank or receiver and the numeral 11 indicates an inlet pipe having its inner end terminating inwardly of the tank. The outer end of the pipe 11 leads to an oil well, gas well or the like and the pipe is adapted to conduct the liquid and gas which flow together from the wells into the separating tank. Communicating with the upper extremity of the tank 10 is a gas outlet line 12 adapted to lead to a suitable source of storage for the gas and a liquid outlet line 13 communicates with the lower end of the tank 10. As shown in Figure 1 the liquid outlet line extends preferably horizontally a short distance from the tank and then is directed upwardly substantially parallel with the axis of the tank as indicated at 14. The outer end of the liquid outlet line has a valve 15 arranged therein to control the passage of liquid through the outlet line and into the main line pipe 16 which leads to a suitable storage tank.

Intermediate the ends of its horizontal portion the liquid outlet line has a vertical pipe 17 leading thereinto and the upper extremity of this pipe communicates with a float chamber 18 in which the float 19 is operable. As shown in Figure 1, the portion 14 of the liquid outlet line, the pipe 17 and the axis of the tank 10 are preferably arranged parallel.

An equalizer line 20 has one end communicating with the gas outlet line 12 and the opposite end communicates preferably with the upper portion of the float chamber 18. A short distance from the float chamber the equalizer line is equipped with a one-way valve 21 which is adapted to be opened only under pressure exerted from the direction of the float chamber.

The float 19 is provided with an arm 22 pivotally connected to one end of a bell-crank lever 23 which may be pivoted at 24 to any supporting structure, the opposite end of the lever 23 being connected to the stem 25 of the valve 15.

In the form of the invention shown in Figure 2, the liquid outlet pipe 13 is connected to an auxiliary receiver 26 which communicates at its lower end with a pipe 27 leading into a bucket trap housing 28.

The housing 28 has a downwardly extending tubular portion 29 which communicates with the main line pipe 30 leading to a suitable storage tank. The upper portion of the housing 28 is equipped with a valve 31 controlling the passage of liquid into the pipe 30 and this valve is provided with a relatively long stem 32 extending downwardly substantially to the lower extremity of the tubular portion 29. The lower extremity of the stem 32 is connected to a bucket 33 mounted for vertical movement within the housing. The bucket 33 may be of any desired capacity and its operation will be hereinafter fully explained.

In this form of the invention an equalizer pipe 34 has one end communicating with the gas oulet pipe 12 and preferably, but not necessarily, may be extended downwardly to the receiver 26. Intermediate the ends of the equalizer pipe, a pipe 35 communicates at one end therewith and at its opposite end with the interior of the housing 28. The pipe 35 is provided with a one-way valve 36 which opens only upon the exertion of pressure from the direction of the housing.

If desired, the tank 10 may be provided with a suitable pressure gauge 37.

The operation of the apparatus shown in Figure 1 is as follows:

Liquid and gas enters the separating tank 10 through the pipe 11 and the liquid immediately falls to the bottom of the tank. When enough liquid flows into the tank to enable the liquid to reach its high level shown in dotted lines in Figure 1, it will be obvious that because of the arrangement of the pipe 17 the liquid will also rise to a similar height in this pipe. When the liquid reaches the level referred to it moves the float 19 upwardly, causing the bell-crank lever 23 to open the valve 15 and permit the liquid to flow into the pipe 16. If the one-way valve 21 were omitted from the equalizer line 20, it would be obvious that the valve 15 would remain open only as long as the liquid level in the tank 10 remained high enough to operate the float 19. However, with the one-way valve in operation in the equalizer line, which valve cannot be opened by pressure exerted from the direction of the gas outlet line, after the float 19 has been moved sufficiently to open the valve 15, the pressure of the gas in the tank 10 above the level of the liquid is sufficient to force the liquid out of the tank through the pipe 13 and into the line 16, the liquid in the pipe 17 remaining at a height sufficient to keep the float 19 where it will hold the valve 15 open. When the liquid has reached its low level indicated by dotted lines, gas begins to escape along the surface of the liquid in the pipe 13 and bubbles up through the liquid in the pipe 17 gradually displacing the liquid in the float chamber 18 and consequently causing the float 19 to drop and close the valve 15. The float 19 will not operate under the pressure of the gas and consequently the dropping of the float is positive once the liquid in the float chamber has been displaced.

After the contents of the tank 10 has been discharged as stated and the valve 15 closed, the operating parts of the device are not placed in operation until the liquid again reaches its high level in the tank 10. When this high level is again reached any gas in the chamber 18 or pipe 17 will be forced upwardly and as the valve 21 is adapted to open under a very slight differential of pressure, most of this gas will escape into the equalizer line 20 and the float 19 will again be operated by the liquid.

In the form of the apparatus shown in Figure 2 the action of the gas pressure within the tank 10 is substantially the same as that described in connection with the form of the apparatus previously described. When the liquid reaches its high level indicated in dotted lines it will have reached a similar level in the pipe 27 and thus the housing 28 will be filled with the liquid. After the liquid has arisen in the housing 28 to a height sufficient to overflow the walls of the bucket 33 the latter is filled with the liquid and is forced downwardly thus opening the valve 31 and permitting the liquid to escape from the housing through the tube 29 and outlet pipe 30. When the liquid has reached its low level indicated by dotted lines gas will escape into the pipe 27 and will displace any liquid therein. As the receiver and tank 10 again fill with the liquid, the gas which escapes into the housing 28 gradually forces any liquid in the housing into the discharge pipe 30 thus causing the bucket 33 to ascend and close the valve 31. As the liquid again enters the housing 28 the gas is forced through the pipe 35 past the one-way valve 36 and into the equalizer line 34 where it flows into the gas outlet line 12.

It will be apparent that I have provided apparatus which will discharge substantially the entire contents of the separating tank 10 in the form of the apparatus shown in Figure 1, and substantially the entire contents of the tank 10 and receiver 26 shown in Figure 2, with each operation of the outlet valves 15 and 31. Therefore, it will be apparent that I have provided an apparatus which obviates the disadvantages of the prior types of apparatus referred to and which is economical in operation and capable of long life.

It is to be understood that the forms of my invention herewith shown and described are to be taken as preferred examples of the same and that various changes in the shape, size, and arrangement of parts may be resorted to without departing from the spirit of the invention or the scope of the subjoined claims.

I claim:—

1. In apparatus for separating liquid from gas, a tank wherein said liquid and gas are continuously accumulated, and means automatically operable to discharge substantially all the liquid accumulated in said tank when the liquid has risen to a predetermined height in said tank, said means being initially operable by the weight of the liquid within the tank and being continued in operation by the pressure of the gas in said tank.

2. In apparatus for separating liquid from gas, a tank wherein said liquid and gas are continuously accumulated, a liquid outlet line and a gas outlet line connected to said tank, an equalizer line connected between said gas and liquid outlet lines, mechanical means automatically operable to initially discharge liquid from said tank, and means arranged in said equalizer line for utilizing the gas pressure within said tank to continue the discharge of said liquid.

3. In apparatus for separating liquid from gas, a tank wherein said liquid and gas are continuously accumulated, a liquid outlet line and a gas outlet line connected to said tank, an equalizer line connected between said gas and liquid outlet lines, mechanical means automatically operable to initially discharge liquid from said tank when the liquid has risen to a predetermined height therein, and means arranged in said equalizer line for utilizing gas pressure within said tank to continue the discharge of said liquid until the latter has reached a predetermined low point in said tank, said mechanical means being automatically operable to prevent further discharge of liquid after said low point has been reached.

4. In apparatus for separating liquid from gas, a tank wherein said liquid and gas are continuously accumulated, a gas outlet line leading from said tank, a separate liquid outlet line leading from said tank, a pipe connecting said gas and liquid outlet lines, a valve in said pipe opening under pressure exerted solely from the direction of said liquid outlet line, and mechanical means associated with said liquid outlet line, to initially discharge liquid from said tank, continued discharge of said liquid being accomplished by gas pressure from within said tank.

5. An apparatus constructed in accordance with claim 4 wherein said mechanical means is automatically operative when the liquid rises to a predetermined high level in the tank, the gas pressure being operative until the liquid reaches a predetermined low level in the tank, said mechanical means being automatically operable to prevent further discharge of liquid after said low level has been reached.

6. In apparatus for separating liquid from gas, a tank, means for delivering liquid and gas to said tank, an outlet line for said gas connected to said tank, a separate outlet line for said liquid connected to said tank, an equalizer line connected between said gas and liquid outlet lines, a one-way valve arranged in said equalizer line which is adapted to be opened by pressure solely from the direction of said liquid outlet line, and means for discharging quantities of liquid from said tank through said liquid outlet line at intervals.

7. An apparatus constructed in accordance with claim 6 wherein said means is initially operable by the weight of said liquid and is continued in operation by the pressure of the gas within said tank.

8. In apparatus for separating liquid from gas, a tank wherein said liquid and gas are continuously accumulated, a gas outlet line leading from said tank, a separate liquid outlet line leading from said tank, a pipe connecting said gas and liquid outlet lines, a valve in said pipe opening under pressure exerted solely from the direction of said liquid outlet line, a second valve arranged in said liquid outlet line, and means operable by the action of said liquid to open said second valve to permit the discharge of said liquid from said tank.

9. An apparatus constructed in accordance with claim 8 wherein continued discharge of said liquid is accomplished by the pressure of the gas within said tank.

10. In apparatus for separating liquid from gas, a tank wherein said liquid and gas are continuously accumulated, a gas outlet line leading from said tank, a separate liquid outlet line leading from said tank, a pipe connecting said gas and liquid outlet lines, a valve in said pipe opening under pressure exerted solely from the direction of said liquid outlet line, a second valve arranged in said liquid outlet line, a float chamber associated with said pipe between said liquid outlet line and said first named valve, and a float in said chamber controlling said second valve, said second valve being initially opened to permit discharge of said liquid from said tank by the action of said liquid against said float, said liquid being maintained in contact with said float by the pressure of gas within said tank until substantially all the liquid accumulated in said tank has been discharged therefrom.

11. In apparatus for separating liquid from gas, a tank wherein said liquid and gas are continuously accumulated, a gas outlet line leading from said tank, a separate liquid outlet line leading from said tank, a pipe connecting said gas and liquid outlet lines, a valve in said pipe opening under pressure exerted solely from the direction of said liquid outlet line, a second valve arranged in said liquid outlet line, a bucket trap associated with said pipe between said liquid outlet line and said first named valve, a bucket movable in said trap and controlling said second named valve, said second valve being initially opened to permit discharge of said liquid from said tank by the action of said liquid against said bucket, said liquid being maintained in contact with said bucket by the pressure of gas within said tank until substantially all the liquid accumulated in said tank has been discharged therefrom.

In testimony whereof I affix my signature.

JOHN YOUNG SNYDER.